US00RE34704E

United States Patent [19]

Cole

[11] E Patent Number: Re. 34,704

[45] Reissued Date of Patent: Aug. 23, 1994

[54] IMPROVED POLLUTION DETECTION APPARATUS

[76] Inventor: Martin T. Cole, 7 Loxwood Avenue, Keysborough, Victoria, 3173, Australia

[21] Appl. No.: 360,268

[22] Filed: Jun. 2, 1989

Related U.S. Patent Documents

Reissue of:

[64] Patent No.: 4,670,741
Issued: Jun. 2, 1987
Appl. No.: 663,324
Filed: Oct. 22, 1984

[30] Foreign Application Priority Data

Oct. 22, 1984 [AU] Australia ..... PG1975/83

[51] Int. Cl.[5] ..... G08B 17/10

[52] U.S. Cl. ..... 340/630; 250/573; 250/575; 340/753

[58] Field of Search ..... 340/627-630, 340/753, 754, 722, 715, 808, 688, 870.02, 870.29, 870.44, 725; 374/190; 250/573-575, 221, 222.1, 222.2; 356/439, 335-337, 437, 438; 73/28, 23

[56] References Cited

U.S. PATENT DOCUMENTS

| | | | |
|---|---|---|---|
| 513,829 | 1/1894 | Shureman | 340/688 |
| 2,867,698 | 1/1959 | Gondolfo | 340/688 |
| 3,684,870 | 8/1972 | Nelson | 340/753 |
| 3,824,402 | 7/1974 | Mullaney et al. | 250/574 |
| 3,860,818 | 1/1975 | Stadler et al. | 356/437 |
| 3,874,795 | 4/1975 | Packham et al. | 340/630 |
| 3,982,130 | 9/1976 | Trumble | 356/439 |
| 4,171,490 | 10/1979 | Tatetsuki et al. | 340/630 |
| 4,317,113 | 2/1982 | Honma | 356/438 |
| 4,464,656 | 8/1984 | Nakamura | 340/722 |

*Primary Examiner*—Edward L. Coles, Sr.
*Assistant Examiner*—Jill Jackson
*Attorney, Agent, or Firm*—Learman & McCulloch

[57] ABSTRACT

In a smoke detection system, smoke density in a sampling chamber is measured by flashing a strobe light through the chamber and sensing light flux emitted from the chamber and comparing it with light flux from the strobe light itself. The measurements are performed by peak detectors which load sample-and-hold circuits to provide steady signals. The two signals are combined in mathematical manner to compensate for zero-offset and rate error between the two signals. The combined and corrected output is used to actuate a visual alarm signal, such as a segmented bargraph display to indicate air pollution. The bargraph has programming pins for tapping off each individual bargraph segment to achieve plural preset alarm thresholds.

12 Claims, 7 Drawing Sheets

IMPROVED POLLUTION DETECTION APPARATUS

Matter enclosed in heavy brackets [ ] appears in the original patent but forms no part of this reissue specification; matter printed in italics indicates the additions made by reissue.

The present invention relates to optical air pollution monitoring apparatus and more specifically an early warning fire detection apparatus incorporating a light scatter detection technique.

Numerous lives and billions of dollars in buildings and contents are lost each year because of fire. Conventional early warning smoke detection devices have been proven insensitive to detection of some highly toxic fumes liberated from commonly used synthetic materials. It is critical that fire fighting units are alerted at the earliest possible moment of the outbreak of a fire and that the occupants of an endangered building be evacuated upon production of noxious fumes and fire.

It has been recognized by workers in the field that conventional means of early fire warning by ionization detectors have severe limitations. In fact even in fire situations where considerable smoke has been generated the detector has not be activated. Such delays may result in dangerously low escape times for building occupants or permit the development of a fire to a point where considerable damage is done; because of the delayed warning.

Some factors that influence the operating efficiency of an early warning system include:

1. The effect of forced ventilation sometimes preventing smoke from reaching ceiling mounted detectors;
2. Partial or complete shielding of detectors by building components such as ceiling beams, and ducts;
3. The necessity to de-sensitize detector apparatus to minimize false alarms arising from normal work situations e.g. smoking of cigarettes.

The present invention has as its objective to provide apparatus for detection of air pollution and fires and the initiation of control measures at the earliest possible moment whilst minimizing false alarms.

It is a further objective to provide apparatus suitable for a wide variety of applications for example commercial offices, homes, apartments, hotels, dormitories, hospitals and institutions, art galleries and museums, schools, laboratories, computer rooms, telephone exchanges, power stations, warehouses, ships and railway carriages, etc.

Smoke detectors of the general type to which the present invention relates are disclosed in Australian Patent Specification Nos. 412479, 415158, 465213 and 482860. Specification No. 415158 utilize an intermittently operating light source whilst No. 412479 disclosed the use of a pair of light carrying rods. Specification No. 465213 discloses the removal of air samples from an air space under surveillance to detect he presence of carbon monoxide. Specification No. 482860 discloses the use of a pair of air sampling chambers coupled to a light source and photomultiplier tubes.

Photomultiplier tube designs have incorporated two sampling chambers in order to provide two channels of operation, the outputs of which are balanced in an attempt to counteract the effects of aging and temperature drift, and also to overcome flash tube light intensity variations. This is attempted by means of a summing amplifier, where one channel is connected to the inverting input, the other to the non-inverting input. The resultant output signal is the difference between the two channels. However, this mechanism in fact does nothing to reduce the problems, being based upon a fallacy: let F = light intensity of flash
S = the proportion of light signal scattered from smoke particles
B = the proportion of background light signal (a constant fixed by geometry)
C1 = channel 1 output signal level
C2 = channel 2 output signal level Smoke is introduced into the first chamber only, thus:

$$C1 = F(S+B);$$

$$C2 = F(B)$$

(1) SUBTRACTION OF SIGNALS METHOD:

$$C1 - C2 = F(S+B-B) = FS$$

which is directly dependent upon F but is independent of B, i.e., is sensitive to flash variation although background signals cancel (if matched).

(2) DIVISION OF SIGNALS METHOD:

$$C1/C2 = F(S+B)/F(B) = 1 + (S/B)$$

which is independent of F, that is, is insensitive to flash variation, but is dependent on B, (however B is a constant.)

Let B assume the typical value of 0.2

$$C1/C2 = 1 + 5S$$

Thus to obtain the correct reading for S:

$$S = ((C1/C2) - 1)/5$$

which in practise requires:

(a) a divider circuit,
(b) an offset of −1, and
(c) an attentuation by a factor of 5.

Thus, it is clear there is no advantage in employing a summing amplifier approach, either in an attempt to overcome variations in flash intensity or light detector sensitivity. No advantages stem from a dual chamber device because equal performance is achieved with a single chamber.

The mechanical design of an air pollution detector such as the sampling tube, reflector and absorber means are disclosed in my co-pending Australian application Nos. 31841/84, 31842/84 and 31843/84 respectively filed Aug. 12, 1983. Furthermore, a solid state anemometer suitable for use in measuring ventilation air flow and the like is disclosed in my co-pending application No. PG 4919/84 filed 9th May, 1984.

The present invention relates to the provision of improved electronic circuitry for use in air pollution detection.

As previously mentioned, known detectors such as that disclosed in specification No. 482,860 utilized photomultipliers.

The detector disclosed in Pat. No. 482,860 utilized a photomultiplier tube to detect the extremely low levels of light scattered off low concentrations of airborne smoke. Solid-state detection was considered impossible at room temperatures and at economical cost. As a result of considerable research, solid state circuitry has been developed which appears to have overcome the problems inherent in photomultiplier tube technology. For example, such problems as an extraordinary (10:1) spread in sensitivity from device to device, fragility, aging, degradation when exposed to bright light, and the need for a special high-voltage power supply of high stability have been met.

A solid-state detector cell requires a preamplifier of extremely low noise, requiring development of a state-of-the-art design. Therefore detector cell and Xenon flash noise became the dominant, though insignificant source of noise. Temperature compensation is also required, to provide calibration accuracy spanning at least zero to fifty degrees Celsius.

Contending with a flash rise-time of 1 microsecond, the detector cell should be small to minimize capacitance. This however, reduces the 'photon capture area' compared with the use of a photomultiplier tube and a focusing lens with associated mounting hardware. Close attention to the preamplifier design using pulse-amplifier techniques is partly responsible for the noise reduction in the detector of the present invention. Earthing is of course another critical factor, together with a suitable interference-shielding container. In addition, immunity to power supply variations has required special attention. The preamplifier, detector cell, optics and housing is preferably supplied as a self-contained separately tested plug-in module.

There is provided according to the present invention a light sensing apparatus including amplifier means comprising pulse amplifiers for producing an output pulse of high amplitude, means for detecting and storing the peak amplitude of said pulse at least until receipt of a further output pulse, said apparatus adapted to receive and amplify signals received from a solid state photo cell subjected to a flashing light source.

There is provided according to the present invention in a more specific aspect a light sensing apparatus including an amplifier comprising pulse-amplifiers producing an output pulse of high amplitude, an active peak-detector of high accuracy and linearity over a wide range and an active sample-and-hold circuit associated with a summing amplifier, said apparatus adapted to receive and amplify signals received from a solid state photo cell subjected to a flashing light source.

Conveniently synchronization of the peak-detector, sample-and-hold circuit and the flash light source (Xenon flash tube) is achieved using a multiphase clock.

In a further aspect of the invention the detection and storage means comprises a micro-processor for receiving said amplified signals received from said solid state photo cell subjected to said flashing light.

There is also provided by the present invention a control means for use in association with a light sensing air pollution detection apparatus including a current measuring means such as a moving-coil meter or an LED (light emitting diode) bargraph display for receiving signals from said light sensing apparatus to indicate air pollution (such as smoke) intensity.

Conveniently, three alarm thresholds are set to levels to correspond with desired points on the meter scale, or bargraph display.

In a further aspect of the present invention there is provided a light sensing apparatus in a pollution detection apparatus including a flash light source, amplifier means for producing an output pulse of high amplitude in response to said light flash, means for detecting and storing the peak amplitude of said output pulse, means for monitoring the flash intensity of said flash light source, means for detecting and storing the peak amplitude of the monitor pulse, divider circuit means for receiving said output and monitor pulses and providing compensation and improving the accuracy of the signal in the detection apparatus.

The invention will be described in greater detail having reference to the accompanying diagrams in which.

Figure 1:
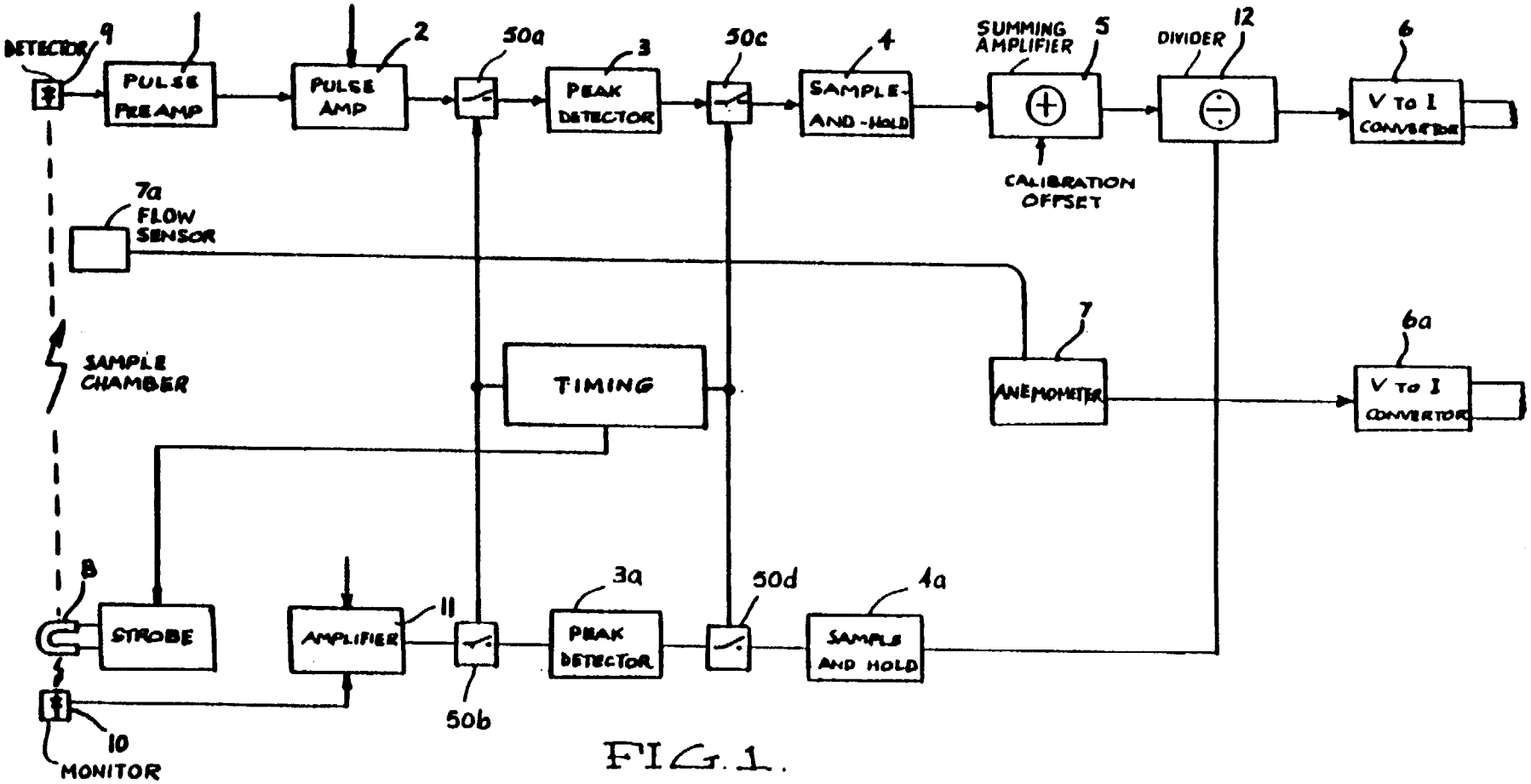
FIG. 1 is a block diagram of a detector circuit according to the invention.

With reference to FIG. 1 the detector circuit receives a signal from the solid state detector cell and pulse preamplifier circuit as in described in greater detail in my co-pending patent application no. 31841/84 mentioned above. The signal passes to a pulse-amplifier producing an output pulse of high amplitude. Gain adjustment of the amplifier 2 provides adjustment of the signal to achieve calibration. A peak-detector 3 of high accuracy and having good linearity over a wide dynamic range and a single active sample-and-hold circuit 4 of particularly low leakage and also having good linearity over a wide dynamic range plus a summing amplifier 5 and transconductance amplifier 6 for providing a constant-current output drive. Electrical gates 50a and 50c are provided to connected the peak detector 3 to its input from amplifier 2 and to connect its output to sample-and-hold circuit 4. These gates are opened and closed in proper sequence, in synchronism with the flashing of strobe light 8, under control of the timing circuit shown, or under the control of a clock circuit in a computer. The calibration offset allows for offset of the effects of remnant background light (which is a fixed component) in the sampling chamber to the point where the signal is independent of the effects of background light.

With reference to FIG. 1 to improve production and testing of the apparatus all electronic circuitry, apart from the detector cell and the preamplifier module, is incorporated onto a single printed circuit board.

Figure 1A:
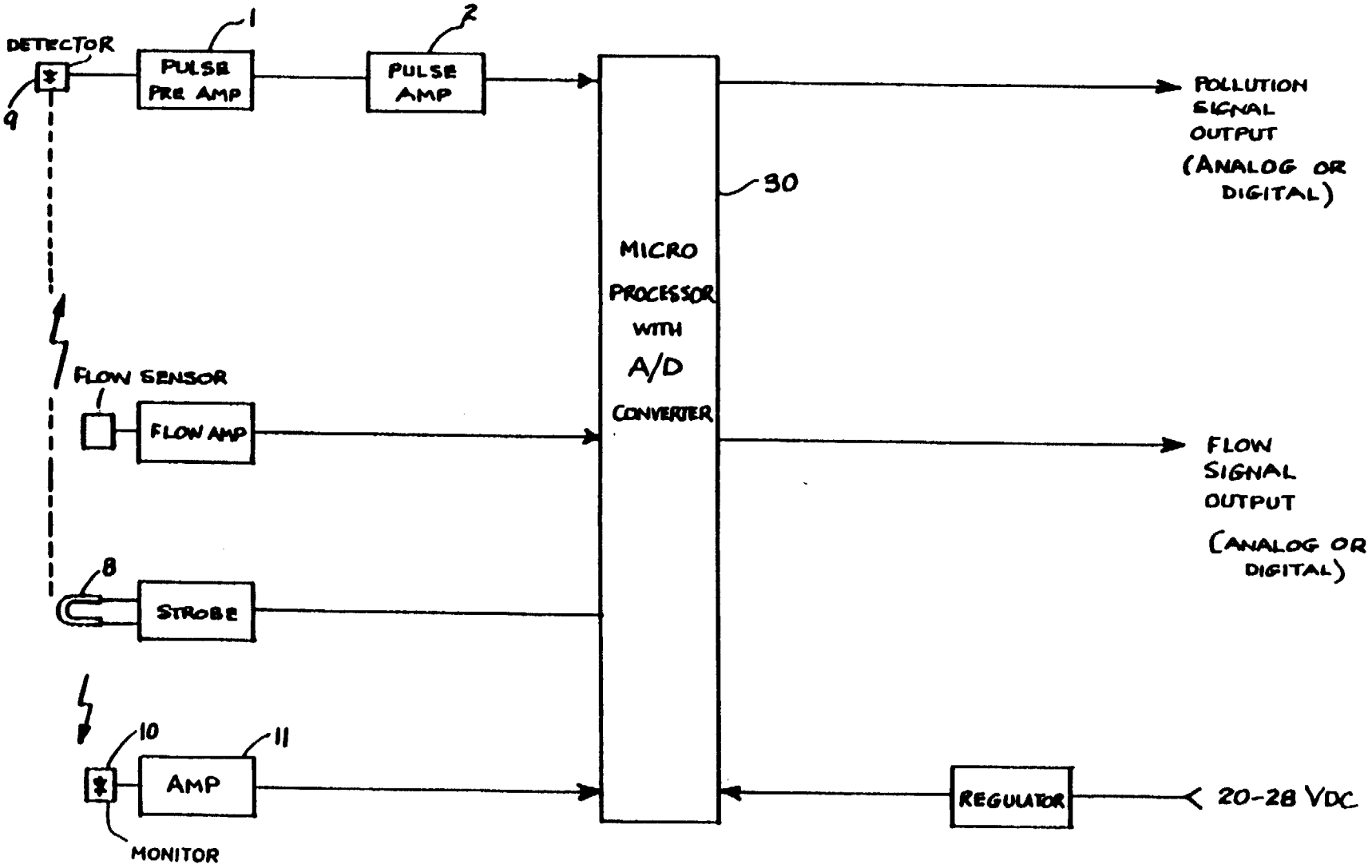
FIG. 1A is a block diagram showing the alternative use of a micro processor in the detector circuit.

Referring to FIG. 1A there is shown an alternative arrangement wherein the peak detector 3 and sample-and-hold circuit 4 is replaced by a micro-processor 30 programmed to receive and store the peak amplitude of an output pulse from said pulse amplifier. The micro-processor can be a standard microprocessor, such as are used in numerous similar personal computers, on the consumer marker, or can be the entire personal computer itself. Any good personal computer can be loaded with a program which will enable it to perform the required operations on the signals received. The microprocessor can be used for division of the signal from the monitor amplifier and provides the timing for the flash tube 8.

The normal sampling rate of the monitored space is approximately 3 seconds however, D.C. stability is sufficient to allow optional sampling rates up to 30 seconds thus allowing extension of Xenon flash tube life to as long as 20 years (suitable for areas of relatively slow potential fire growth).

Whereas it is customary to provide a regulated supply it is possible with the present invention circuitry to permit operation from an unregulated 24 V DC supply which can include standby batteries (20–28 V, tolerance), in conformity with most conventional fire alarm systems. Wide voltage tolerance provides for greater immunity to cabling voltage-drop. In view of the standby battery capacity requirement, circuitry is refined to reduce power consumption to 6 Watts. This further reduces cabling voltage-drop problems. The Xenon flash power supply provides the greatest opportunity for this power reduction, through increased efficiency, of a 400 V inverter. To maximize consistency of flash brilliance, this supply is tightly regulated and temperature compensated.

Preferably the device includes a Xenon flash tube monitor 10 in the sampling chamber to calibrate or adjust for variations in flash intensity that may result from "flash noise", aging, or temperature. The monitor 10 is connected to amplifier 11, gate 50b, peak detector 3a, gate 50d and sample-and-hold circuit 4a. These operate in the same manner as do the corresponding circuits in the channel which responds to the output of detector 9. Accordingly, divider 12 provides compensation of the signal received from the monitor 10 and amplifier 11 thereby improving the accuracy of the signal in the detector circuit going to the control.

The divider 12 includes circuitry adapted to convert signals received form the detector 9 and monitor 10 to logarithms then to subtract said logarithms, reconverting the resultant signal by an antilogarithm circuit to a normal signal. Thus, the divider circuit will remove or compensate for flash intensity variation or temperature variations.

The alarm threshold of the air flow sensor 7a may be factory preset within the detector. However, it is preferable to provide an analog output of air flow, utilizing an identical output circuit to that used for smoke intensity (another transconductance amplifier 6a). The constant-current output in both cases provides complete immunity to errors introduced by cabling losses, whilst a low impedance load followed by low-pass filtering and over-voltage protection within the control unit, overcomes interference induction. The alarm threshold can then be set conveniently in the control unit, to a flow rate consistent with the response time required for detection.

Figure 2A:
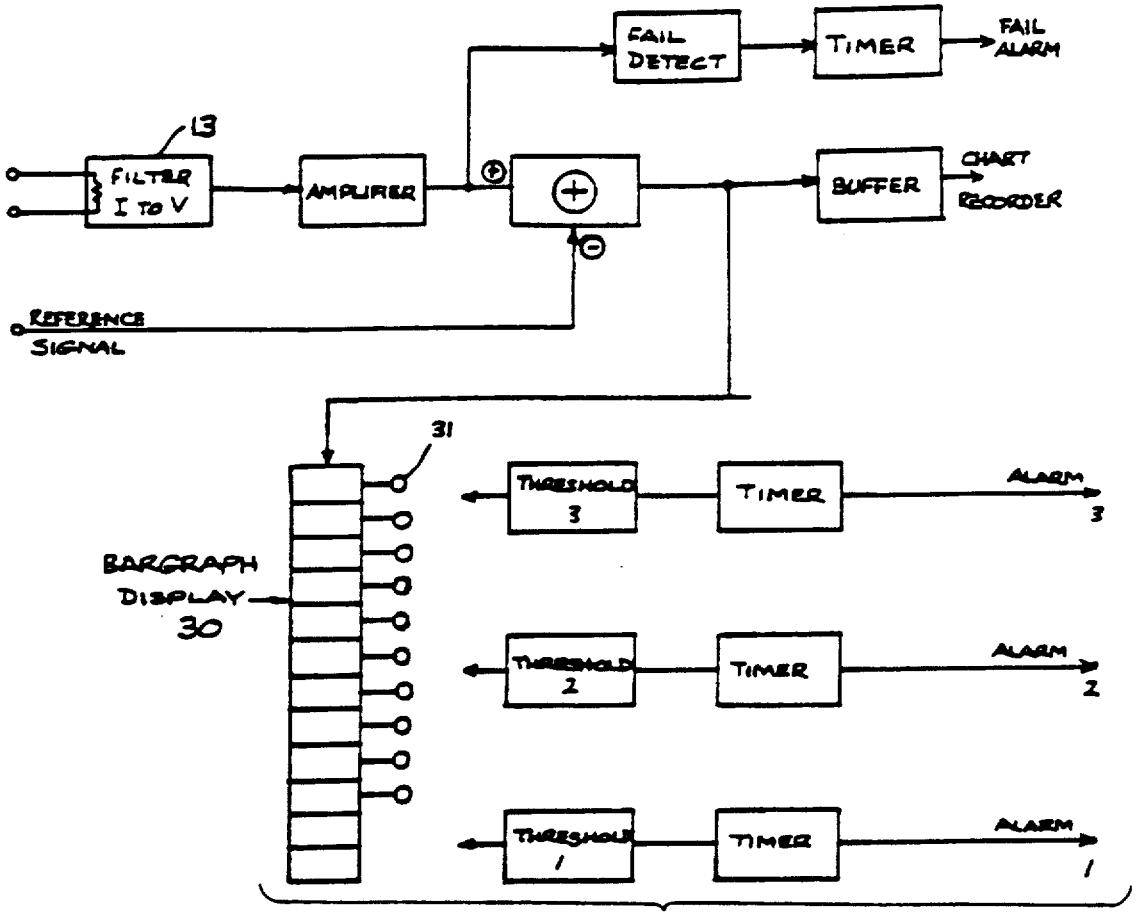
FIG. 2a is a block diagram of a controller circuit including a bargraph display.
Figure 2B:
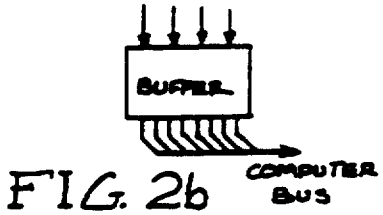
FIG. 2b is a block diagram of the input interface of a computer.
Figure 2C:
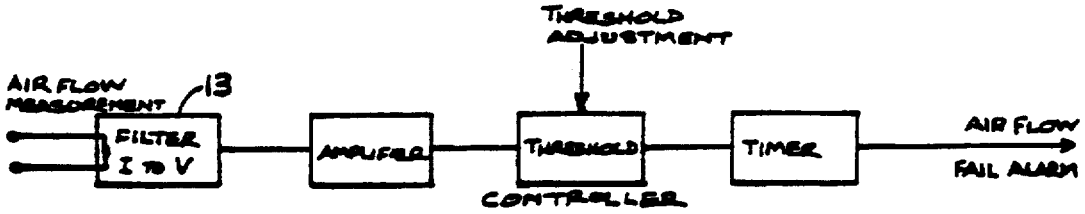
FIG. 2c is a block diagram of the air flow monitoring circuits.
Figure 6:
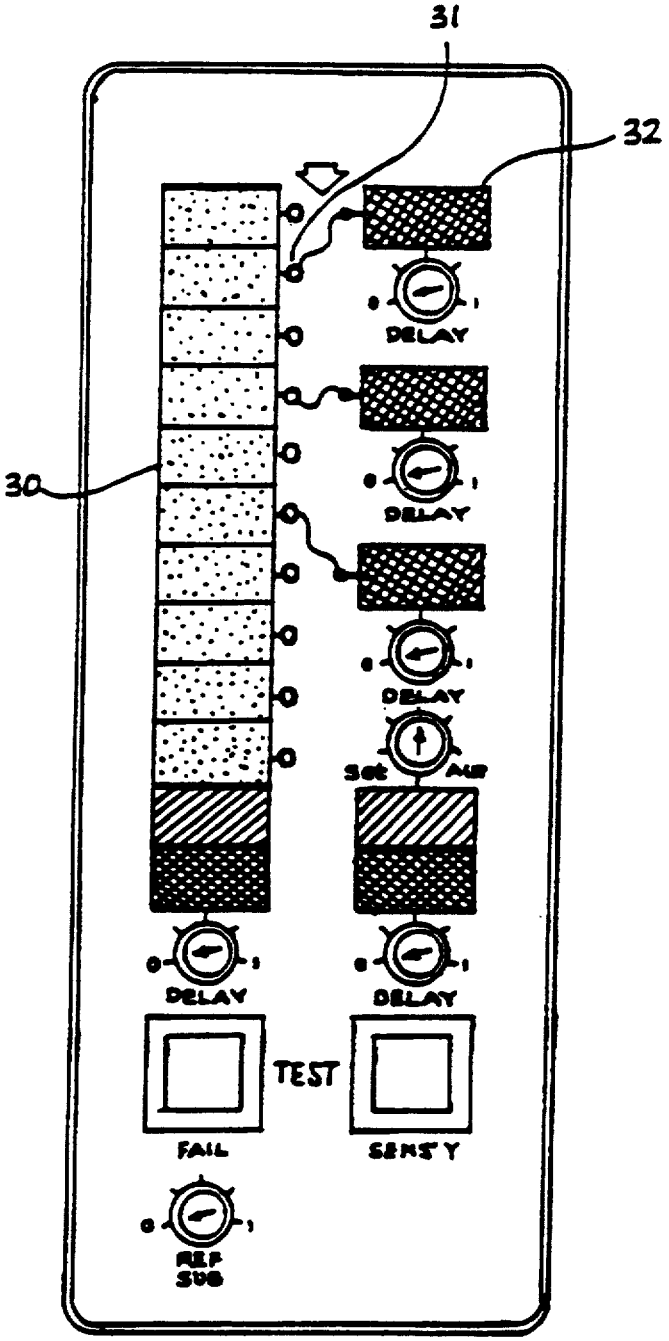
FIG. 6 is a diagram of the controller face with the bargraph and alarm connections.
Figure 7:
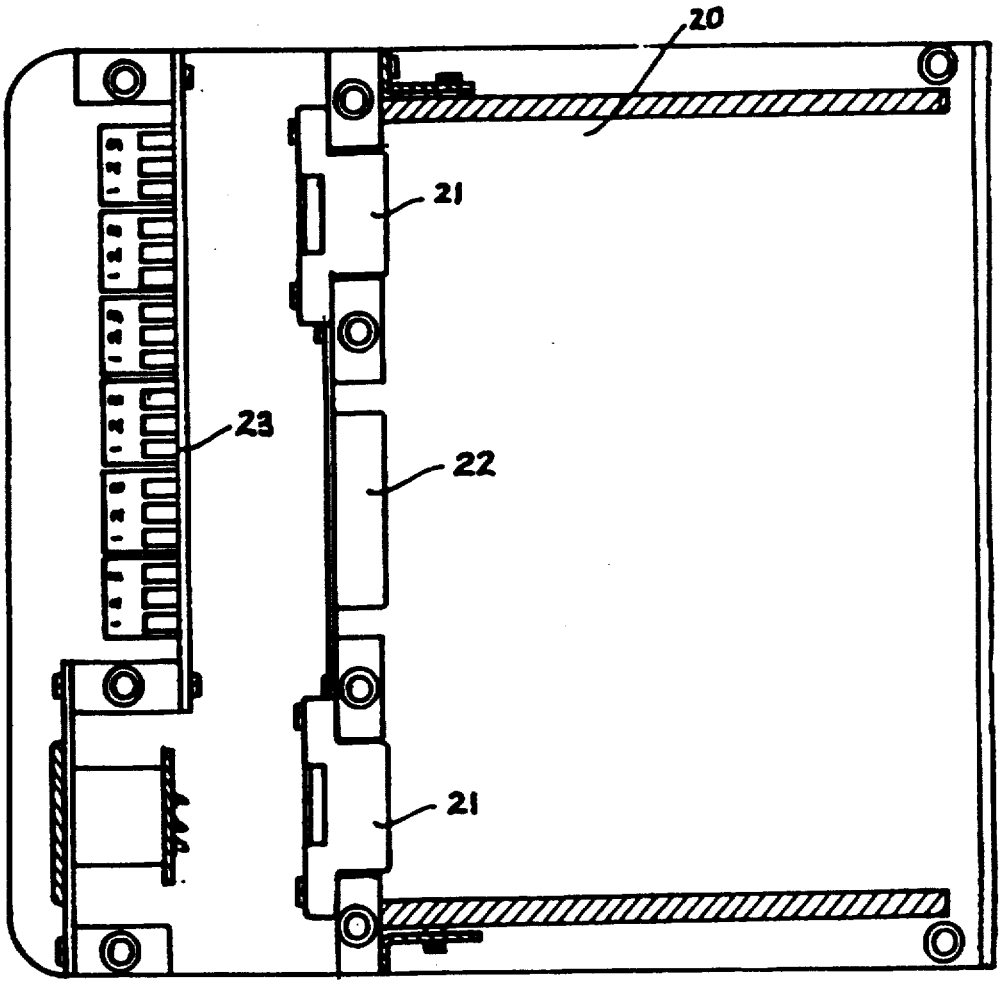
FIG. 7 is a sectional view of a controller card housing.

The voltage signal is converted to current by convertor 6 to avoid the effects of losses in the line to the controller which may be at a remote station in the building. With reference to FIG. 2 and FIG. 6 the current signal from the detector is received and converted to voltage at 13. The controller includes a housing for up to eight (say) individual control cards 20 (FIG. 3) each associated with a detector. The housing may be of extruded aluminium rail frame and side plate construction whereby it is adaptable to accommodate from one to eight control cards. Thus, where space is at a premium the size of the housing can be reduced by shortening the rails.

Originally the control unit provided four output relays namely: Alarm 1, Alarm 2, Alarm 3 and Fail. The Fail relay combined the functions of air flow failure and smoke detection failure. Preferably these two functions are split on the basis that they might require a differing response. A sixth relay is added to indicate that a test is being performed so that operation of any other relay can be ignored until completion of the test. According to the present invention it is proposed to transfer the size relays to a separate relay interface card 23 which can be driven by all controller cards using a ribbon-cable bus in a "daisy-chain" connection.

Figure 3:
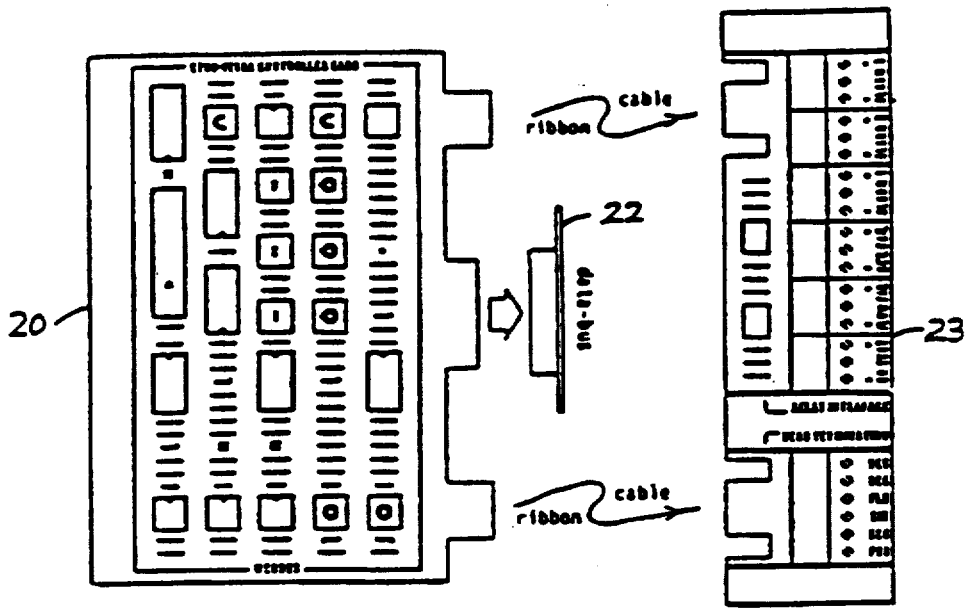
FIG. 3 is a diagram showing control card interconnections.
Figure 4:
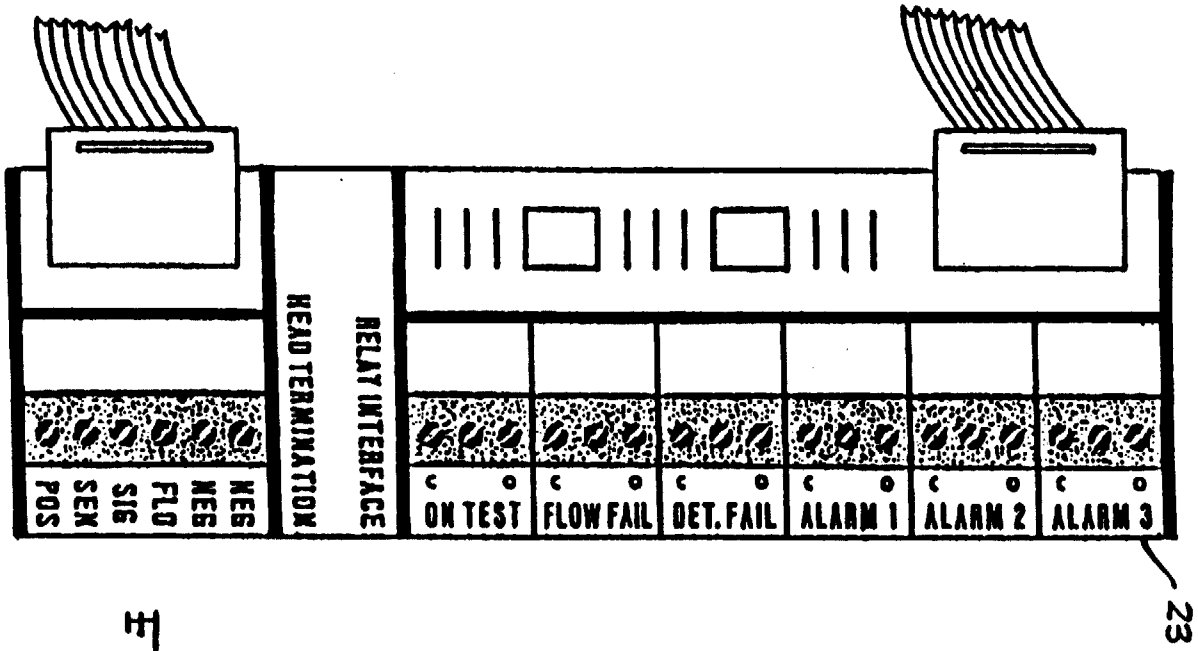
FIG. 4 is a diagram of interconnection between a controller card and detector head.
Figure 5:
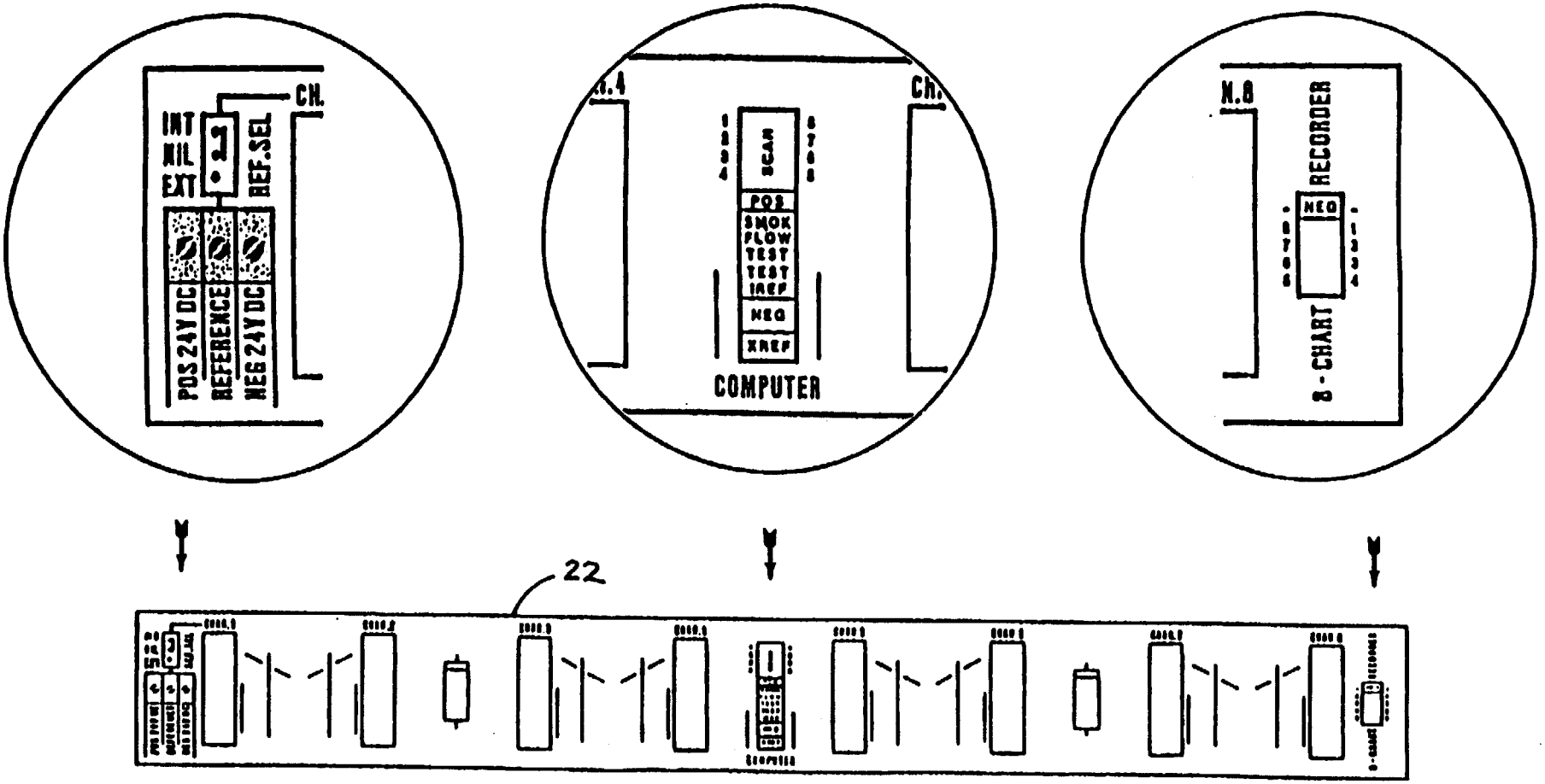
FIG. 5 is a diagram showing connections between a control unit and data buses.

To minimize the number of electrical transitions beyond the control card for any given wire whilst maximize physical design flexibility, the housing frame accommodates a mixture of ribbon-cable 21 and printed-circuit edge connectors 22. This design also facilitates the replacement of any ribbon-cable for one of a different length or configuration, to suit unexpected situations that may arise in the field. FIGS. 3, 4 and 5 depict schematically the control card interconnections with the optional data bus and computer or micro processor (not shown) and a relay interface card 23.

Calibration and testing of the detector is simplified by adopting a full scale measurement of 5.5 milli-amps. An 0.5 milli-amp offset is used to assist in sensing signal loss caused by lamp failure, cable breakage etc. Each additional 0.5 mA represents an increment of 0.01% pollution e.g. smoke. Within the controller this is translated to one volt offset with one volt major scale divisions and eleven volt full scale. Beyond the failure-detection circuitry the inclusion of a summing amplifier permits subtraction of the one volt offset before presentation of the display and the chart-recorder output such that 0–10 volts represents 0–0.10% smoke (0–1000 parts/million).

Calibration of the detector utilizing the known scattering-coefficients of suitable pure gases requires outputs such as 0.775 mA for Carbon Dioxide and 2,200 mA for Freon 12, whilst the sensitivity-test output was set to 4.5 mA.

The span of 0.5–5.5 mA was selected for low power consumption, however, the design is sufficiently flexible to allow the Detector and Controller according to the invention to be reconfigured to comply with the industrial controls standard of a 4–20 mA signalling current loop. Referring to FIG. 6 each controller card 20 an individual LED bargraph display 30 showing smoke intensity is provided. Thus, from a distance, without the need for switch selection, the readings from all Detectors can be readily seen.

Utilizing the bargraph circuitry a gold plated programming pin 31 on a roving lead is coupled to each of the three alarm thresholds 32 providing a convenient and easily viewable means for setting the alarm levels.

As a fail-safe feature in the unlikely event that programming pins are left unplugged or broken, an override circuit ensures that the third alarm threshold automatically defaults to the full-scale smoke level. Timers for delaying the operation of each alarm, adjustable by means of potentiometers, are located immediately below their relevant alarm lamp, and are accessible without removing the Controller card. Also located on the front of the Controller card are test buttons for detector sensitivity and detector failure. Timer adjustments and testing facilities are hidden and protected behind an escutcheon to prevent tampering.

A feature of the control unit is the provision of a switch-option to designate the first (left-most) Controller card and its associated Detector as the Reference channel.

Output from the first Controller is buzzed to all other Controllers, with the degree of signal subtraction individually adjustable (0–100%).

This Reference Detector is adapted to measure the incoming air quality at the make-up air register of an air-conditioning system. To ensure that the Controller would respond only to the net gain in smoke from sources within the building, the output from the Reference Detector can be subtracted, partially or wholly. Even for large installations, only one Reference Detector would be required. An additional advantage of the reference channel is the ability to provide a separate "pollution alert" for computer areas and other "clean" environments.

Alternatively, the setting of alarm thresholds the operation of time delays and air flow detection can be implemented by a micro-processor by projecting a visual output such as a bargraph or numerical display. When a micro-processor is used in substitution for detectors and controller cards it is feasible to use digital signals methods such as those that conform to RS232 Standard for serial data transmission, as distinct from the analogue method of constant current signals.

The Controller use both a red and a green lamp to indicate air flow with the addition of an adjustable timer to allow for short term reductions in air flow, which might result from normal air-handling control functions in the building (for example in the case of in-duct detection). Matched to this is another pair of lamps for the "Fail" detection circuitry, with a similar timer. Particularly large, dual-element rectangular LED lamps have been developed with careful attention to uniform light diffusion, for all displays (17 lamps per Controller). This permitted escutcheon artwork information to be rear-lit by the lamps, for anesthetic appeal and to avoid ambiguity.

With the bargraph display, yellow LED lamps are used for each segment. The present invention has the adopted philosophy that any alarm condition should be indicated by a red lamp. Thus any red lamp seen from a distance would require attention, whether it proved to be one of the three smoke intensity thresholds, the Detector failure alarm or the air flow failure alarm. To enhance the feeling of urgency, these red lamps are made to flash. Operation of any one of these red lamps indicates the operation of its associated relay.

An optional version of the Controller card according to the present invention has been designed. This provides latching of the red alarm lamps and their associated relays, to account for transient conditions which might disappear before an attendant may arrive (especially in a multi-Detector installation). A toggle-switch is provided on each Controller card, to mount through the escutcheon. Such a switch is chosen for the obvious nature of its positions. In the "normal" position, all red lamps and their relays would be operable and could latch on. While in the "isolate" position, all red lamps and their relays would reset (unlatch) and would remain isolated (disabled), during which the "test" relay would operate (renamed the "isolate-test" relay). In either switch position the true conditions pertinent to the Detector remain clearly displayed because of the bargraph (with its clearly visible programming pins to indicate the alarm thresholds) and the green lamps (indicating the Detector and air flow were correct).

In an alternative form of the invention a data-bus "mother-board" is provided within the control unit to facilitate the connection of a computer, such as a separate building services monitoring computer which is enabled to scan each Controller card to obtain readings of smoke intensity and air flow. In this way it can monitor the entire alarm system and initiate appropriate actions. Its data-logging function permits the automatic compilation of statistics on typical ambient smoke levels and the result of simulated fires, such that alarm thresholds can be optimized. The alarm thresholds within the computer, can be altered at different times. Typically selecting greater sensitivity during hours when a building is unoccupied. It can also activate a sensitivity test or a failure test for each Detector, in conformity with some prearranged schedule.

Subtraction of the reference signal may also be performed by the computer. This enables the time-related dilution/concentration factors to be taken into account on a zone-by-zone basis.

A capability for manual operation in the event of computer malfunction is considered an essential practical requirement, this transition being accomplished on a latching Controller card via the "normal/isolate" switch (i.e. manual system isolated while computer functioning.)

Also provided on the data-bus board is a ribbon-cable connector for all chart-recorder outputs. This facilitates connection to a data-logger, multi-pen recorder or to a selector switch.

I claim:

1. Pollution measurement apparatus comprising:

sample chamber means within which pollution is to be measured;

flashing light means for producing flashes to illuminate the inside of said sample chamber means;

monitoring means for producing first electrical pulses proportional to the strength of the light flashes produced by said flashing light means;

sensing means for producing second electrical pulses proportional to the strength of light flashes leaving said sampling chamber;

first peak-detector and sample-and-hold means responsive to said first electrical pulses for providing a steady first output signal which is proportional to the peak amplitude of the most recently occurring one of said first electrical pulses;

second peak-detector and sample-and-hold means responsive to said second electrical pulses for providing a steady second output signal which is proportional to the peak amplitude of the most recently occurring one of said second electrical pulses;

adjustable divider means, responsive to said first and second output signals, for providing a measurement signal which is the ratio of said two output signals and which accurately indicates the amount of pollution within said sample chamber, compensated for rate error by adjustment of said adjustable divider means.

2. The pollution measurement apparatus for claim 1 comprising further:

algebraic summation means to combine one of said output signals with an adjustable calibration offset signal, to provide a measurement signal which is further compensated for zero offset by adjustment of said adjustable calibration offset signal.

3. The pollution measurement apparatus of claim 1 wherein said first and second peak-detector and sample-and-hold means comprise:

analog-to-digital conversion and microprocessor means, responsive to said sensing and said monitoring means, for producing said measurement signal.

4. The pollution measurement apparatus of claim 1 comprising:

a multiphase clock, means for controlling the flashing of said light means, said first and second peak-detecting and sample-and-hold means under the timing control of said multiphase clock.

5. The pollution measurement apparatus of claim 1 comprising:

display means for visually displaying the value of said measurement signal on a bargraph in incremental steps;

programming means for tapping off selected bargraph segments to actuate corresponding alarm means, each alarm means set to be activated at the threshold indicated by the respective tapped segment.

6. The pollution measurement apparatus of claim 5 wherein said programming means comprise:

gold plated programming connecting pins on individual flexible roving leads for coupling to respective ones of said selected bargraph segments to thereby provide viewable indication of the level setting of the respective said alarm means.

7. The pollution measurement apparatus of claim 6 comprising further:

override circuit means for setting an alarm in event of the disconnection of the circuit of a programming pin.

8. The pollution measurement apparatus of claim 5 comprising further:

adjustable means to delay the operation of each alarm a predetermined interval of time.

9. Pollution measurement apparatus as claimed in claim 5 comprising a plurality of controller cards associated with detectors, a selected controller card key associated with a reference detector in a reference area for measuring the quality of incoming air to an area under surveillance, the resultant output received from the reference area being subtracted at least partially from the output of other control channels whereby each control device responding only to net gain in pollution from sources within the surveillance area.

*10. In pollution measurement apparatus having a sample chamber within which pollution is to be measured, and flashing light means for producing light flashes to illuminate the inside of said sample chamber, an improvement comprising: sensing means for detecting light scattered by said pollution and for producing electrical pulses that are proportional to the strength of light leaving the sample; peak detection means responsive to the sensing means for receiving the electrical pulses and for providing first output signals representing peaks of the electrical pulses; sample and hold means responsive to said first output signals for producing a steady output signal that is proportional to the peak amplitude of a most recently occurring one of said electrical pulses, said steady output signal comprising a signal that is adapted to indicate the amount of pollution within said sample chamber; and multiphase clock means for controlling each of said peak detection means, said sample and hole means, and said flashing light means synchronously controlling the production of light flashes, the provision of the first output signals, and the provision of the steady output signal.*

*11. The pollution measurement apparatus of claim 10 wherein said apparatus further comprises absorber means arranged to substantially prevent light impinging on said sensing means other than light scattered by said pollution.*

*12. The pollution measurement apparatus of claim 10 including electrical gate means connected between said peak detection means and said sample and hold means controlled by said multiphase clock means to connect said peak detection means to said sample and hole means in synchronism with the light flashes.*

* * * * *

UNITED STATES PATENT AND TRADEMARK OFFICE

CERTIFICATE OF CORRECTION

PATENT NO. : RE 34,704
DATED : August 23, 1994
INVENTOR(S) : Martin T. Cole

It is certified that error appears in the above-indentified patent and that said Letters Patent is hereby corrected as shown below:

Column 1, line 59, change "he" to -- the --.

Column 4, line 33, change "in" to -- is --; line 45, change "connected" to -- connect --; line 67, change "marker" to -- market --.

Column 5, line 40, change "form" to -- from --.

Column 6, line 13, change "size" to -- six --; line 42, change "2,200" to -- 2.200 --.

Column 7, line 30, change "use" to -- uses --; line 41, change "anesthetic" to -- aesthetic --.

Column 10, line 17, after "sample" insert -- chamber --.

Signed and Sealed this

Twenty-fifth Day of October, 1994

*Attest:*

*Attesting Officer*

Bruce Lehman

BRUCE LEHMAN

*Commissioner of Patents and Trademarks*